US012759201B2

(12) United States Patent
Lee et al.

(10) Patent No.: US 12,759,201 B2
(45) Date of Patent: Oct. 13, 2026

(54) ROTARY MULTI-INJECTION MOLDING MACHINE

(71) Applicant: LG ELECTRONICS INC., Seoul (KR)

(72) Inventors: Gyuho Lee, Seoul (KR); Manin Baek, Seoul (KR); Sik Jeong, Seoul (KR); Bosung Lee, Seoul (KR); Jookwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 19/131,731

(22) PCT Filed: Feb. 22, 2024

(86) PCT No.: PCT/KR2024/002359
§ 371 (c)(1),
(2) Date: May 21, 2025

(87) PCT Pub. No.: WO2025/178149
PCT Pub. Date: Aug. 28, 2025

(65) Prior Publication Data
US 2026/0109090 A1 Apr. 23, 2026

(51) Int. Cl.
*B29C 45/06* (2006.01)
*B29C 45/17* (2006.01)

(52) U.S. Cl.
CPC ........ *B29C 45/062* (2013.01); *B29C 45/1742* (2013.01); *B29C 2045/1746* (2013.01)

(58) Field of Classification Search
CPC .............. B29C 45/062; B29C 45/1742; B29C 2045/1746; B29C 45/06
See application file for complete search history.

(56) References Cited

U.S. PATENT DOCUMENTS 3,520,026 A * 7/1970 Stidham .................. B29C 45/30 425/572
4,877,468 A * 10/1989 Siegenthaler ...... B29D 30/3007 156/243

(Continued)

FOREIGN PATENT DOCUMENTS

CN 101077604 11/2007
CN 201036908 3/2008

(Continued)

OTHER PUBLICATIONS

KR102446661 English translation prepared Feb. 24, 2026 (Year: 2026).*

(Continued)

*Primary Examiner* — Emmanuel S Luk
*Assistant Examiner* — Shibin Liang
(74) *Attorney, Agent, or Firm* — LEE, HONG, DEGERMAN, KANG & WAIMEY

(57) ABSTRACT

A rotary multi-injection molding machine includes a rotary station in which a rotational driving source is disposed; a rotary disposed above the rotary station and rotates by the rotational driving source; a plurality of molds disposed spaced apart from each other on the rotary, in which a cavity is formed at least one of a fixed mold and a movable mold, and in which an injection passage through which material passes is formed in the movable mold; an injection molding machine for molding and supplying a material; a guide having a guide passage formed therein for guiding the material supplied from the injection molding machine to the injection passage; a lifting and lowering mechanism for lifting and lowering the guide; in which the guide, when the guide is lowered by the lifting and lowering mechanism, may press the movable mold from above the movable mold.

13 Claims, 4 Drawing Sheets

(56) References Cited

U.S. PATENT DOCUMENTS

| | | | | |
|---|---|---|---|---|
| 4,941,816 | A * | 7/1990 | Aoki | B29C 45/06 425/534 |
| 5,620,723 | A | 4/1997 | Glaesener et al. | |
| 6,722,875 | B2 * | 4/2004 | Ralph | B29C 45/1761 425/576 |
| 2006/0172039 | A1 | 8/2006 | Imai | |
| 2013/0302468 | A1 | 11/2013 | Ikeda | |
| 2015/0076735 | A1 | 3/2015 | Moyer, II | |
| 2018/0056557 | A1 | 3/2018 | Fukumoto et al. | |
| 2022/0402042 | A1 * | 12/2022 | Ben-Zur | B22F 12/84 |

FOREIGN PATENT DOCUMENTS

| | | | |
|---|---|---|---|
| CN | 103386734 | 11/2013 | |
| CN | 204844658 | 12/2015 | |
| CN | 107584726 | 1/2018 | |
| CN | 208615206 | 3/2019 | |
| CN | 109866406 | 6/2019 | |
| CN | 112706354 | 4/2021 | |
| CN | 214773598 | 11/2021 | |
| CN | 114055702 | 2/2022 | |
| CN | 115319999 | 11/2022 | |
| CN | 219820433 | 10/2023 | |
| CN | 220075473 | 11/2023 | |
| EP | 4046771 | 8/2022 | |
| JP | 07-285146 | 10/1995 | |
| JP | 09-201845 | 8/1997 | |
| JP | 2002337188 | 11/2002 | |
| JP | 2003-231149 | 8/2003 | |
| JP | 2006-347017 | 12/2006 | |
| JP | 2007-216653 | 8/2007 | |
| JP | 5000021 | 8/2012 | |
| JP | 2013-248773 | 12/2013 | |
| JP | 2017-030207 | 2/2017 | |
| JP | 2018030258 | 3/2018 | |
| JP | 2019-177683 | 10/2019 | |
| JP | 2020062850 | 4/2020 | |
| JP | 2021-102273 | 7/2021 | |
| JP | 2021115829 | 8/2021 | |
| JP | 2022115609 | 8/2022 | |
| KR | 1020160058147 | 5/2016 | |
| KR | 1020170043265 | 4/2017 | |
| KR | 102446661 | * 9/2022 | B29C 45/06 |

OTHER PUBLICATIONS

PCT International Application No. PCT/KR2024/002359, International Search Report dated Nov. 20, 2024, 3 pages.
Korean Intellectual Property Office Application No. 10-2025-7013936, Office Action dated Jul. 15, 2025, 7 pages.
Korean Intellectual Property Office Application No. 10-2025-7013936, Office Action dated Apr. 1, 2026, 9 pages.
The State Intellectual Property Office of the People's Republic of China Application Serial No. 202480025639.7, Notice of Allowance dated Apr. 26, 2026, 15 pages.

* cited by examiner

【Fig. 1】
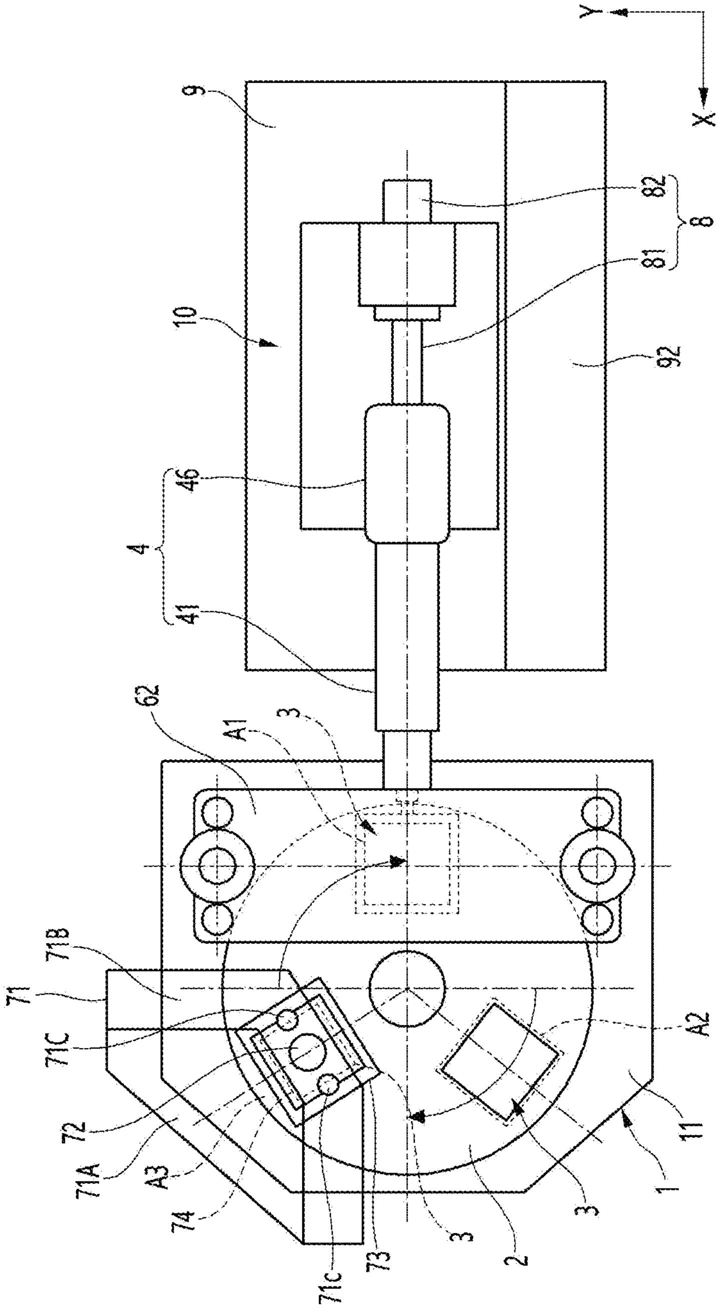

【Fig. 2】
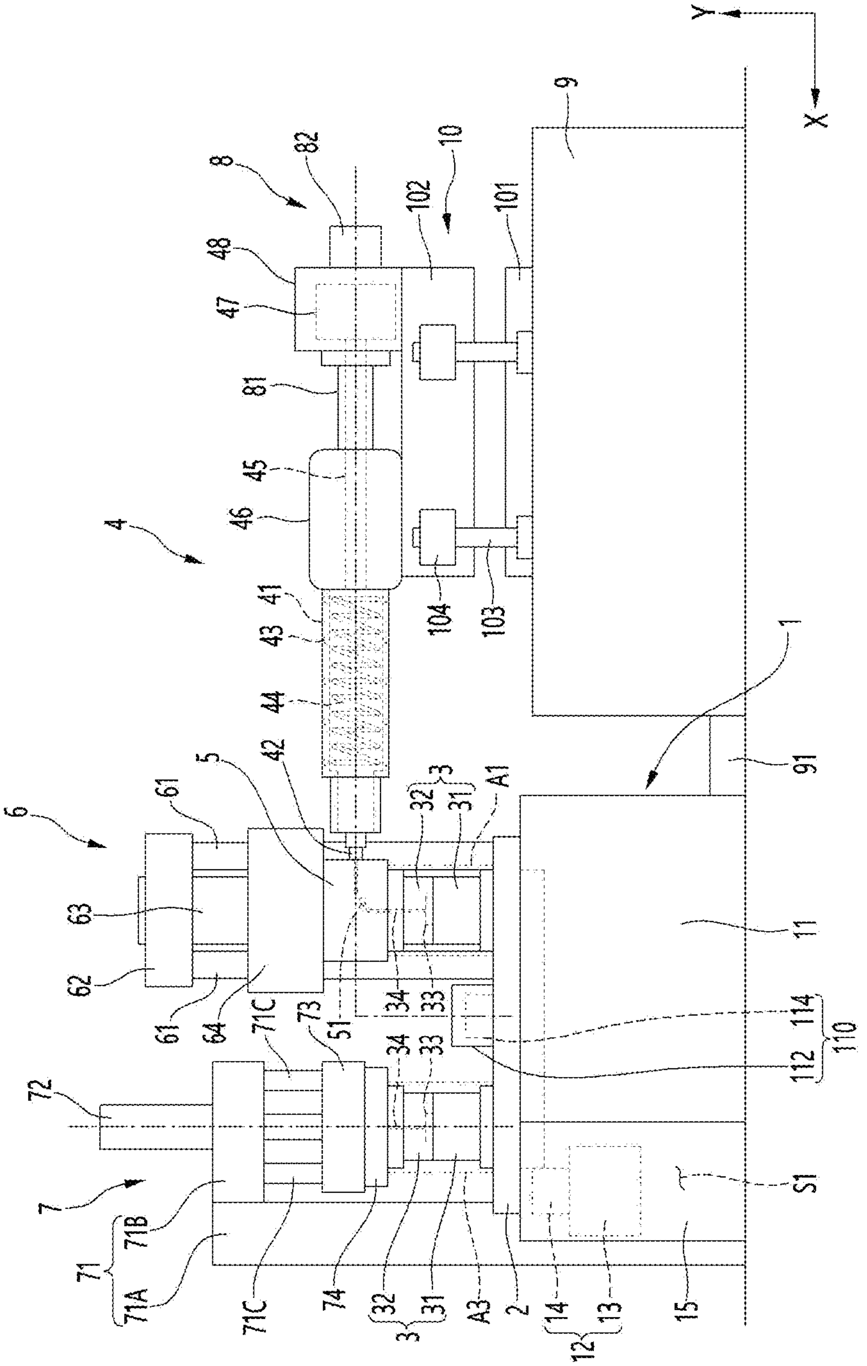

【Fig. 3】
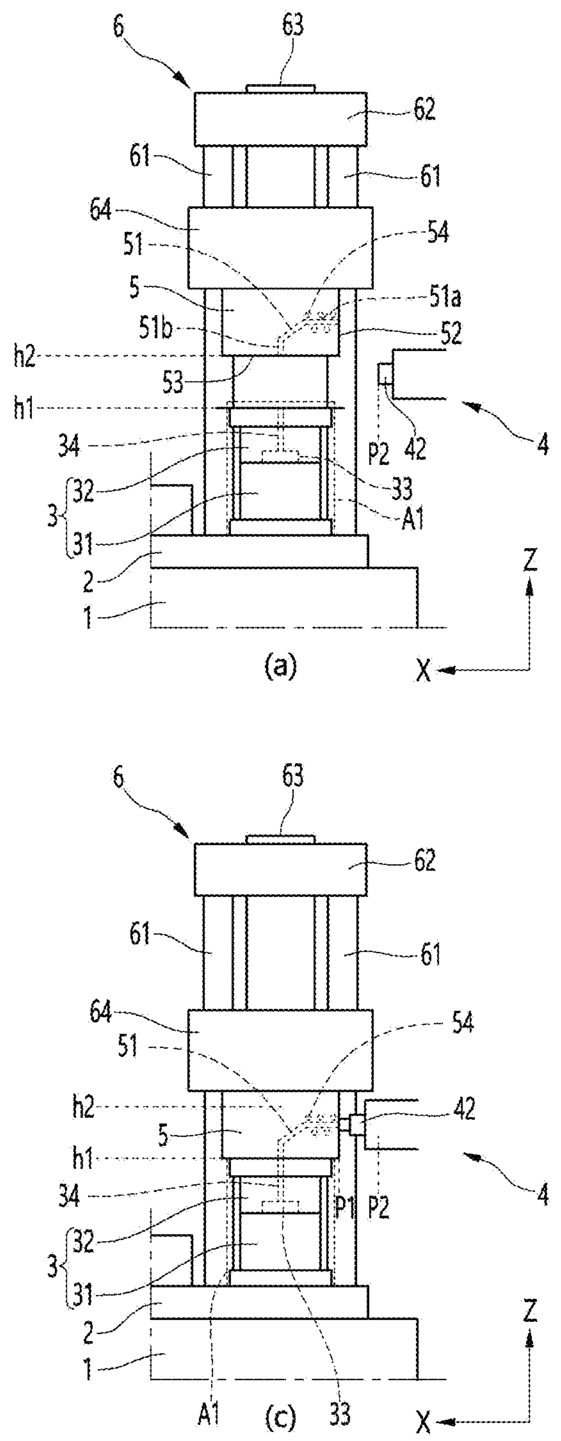

【Fig. 4】
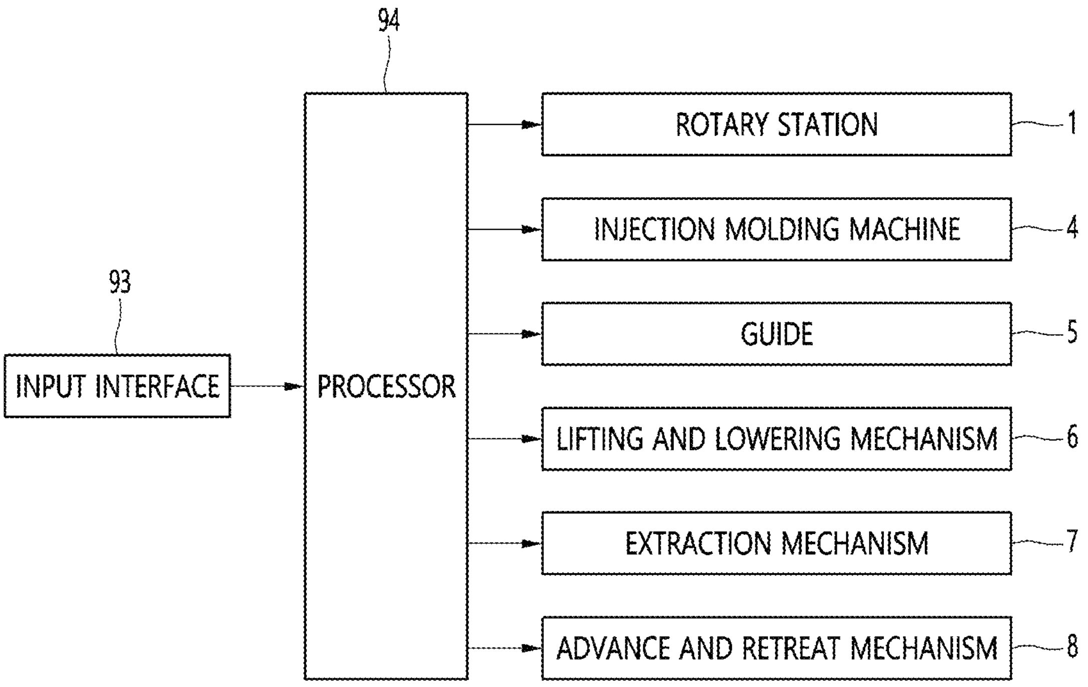

ROTARY MULTI-INJECTION MOLDING MACHINE

CROSS-REFERENCE TO RELATED APPLICATION(S)

This application is the National Stage filing under 35 U.S.C. 371 of International Application No. PCT/KR2024/002359, filed on Feb. 22, 2024, the contents of which are all incorporated by reference herein in its entirety.

TECHNICAL FIELD

The present disclosure relates to a molding machine capable of injection molding a product, and more specifically, to a rotary multi-injection molding machine using a plurality of molds.

BACKGROUND ART

Methods for manufacturing products using synthetic resins such as plastic as raw materials include injection molding using an injection mold, vacuum molding using suction of air, and blow molding using air blow.

The injection molding method can be performed by an injection molding device, and the injection molding device is a device that injects molten resin or the like into a cavity, which is a space within a mold, and then cools the molten resin within the cavity within the mold to manufacture an injection molded product.

An injection molding device includes a mold having a cavity formed in the same shape as a molded product to be manufactured, and an injection molding machine that injects molten resin into the cavity. The mold may include a fixed mold and a movable mold that is coupled to and separated from the fixed mold, and the cavity may be formed between the fixed mold and the movable mold.

The molten resin injected into the cavity in the injection molding machine can be cooled and solidified in the cavity, and the cooled injection molded product can be extracted out of the mold after the movable mold is separated from the fixed mold.

Such an injection molding device may include an injection molding machine and a pair of molds, and each of the pair of molds may include a fixed mold and a movable mold.

If the maximum force that fastens the fixed mold and the movable mold of the injection molding device, that is, the clamping force, is low, the precision of the product may deteriorate and the defect rate may increase.

DISCLOSURE

Technical Problem

An object of the present embodiment is to provide a rotary multi-injection molding machine capable of increasing the precision of a product and minimizing the defect rate.

Technical Solution

A rotary multi-injection molding machine according the present embodiment comprises a rotary station in which a rotational driving source is disposed; a rotary disposed above the rotary station and rotates by the rotational driving source; a plurality of molds disposed spaced apart from each other on the rotary, in which a cavity is formed at least one of a fixed mold and a movable mold, and in which an injection passage through which material passes is formed in the movable mold; an injection molding machine for molding and supplying a material; a guide having a guide passage formed therein for guiding the material supplied from the injection molding machine to the injection passage; a lifting and lowering mechanism for lifting and lowering the guide; and an extraction mechanism for lifting and lowering the movable mold of a mold located in an extraction region among the plurality of molds, in which the guide, when the guide is lowered by the lifting and lowering mechanism, may press the movable mold from above the movable mold.

An upper surface of the rotary may include an injection region in which one of the plurality of molds is located below the guide; a cooling region in which another of the plurality of molds is cooled; and an extraction region in which the other of the plurality of molds is located below the extraction mechanism.

A number of the plurality of molds may be three, and the rotary driving source may repeat a rotation mode that rotates the rotary by 120° and a stop mode that stops the rotary.

The fixed mold may be fixed to the upper surface of the rotary.

The movable mold may be seated on an upper surface of the fixed mold.

The rotary multi-injection molding machine may further comprise an advance and retreat mechanism for advancing the injection molding machine to the guide or for retreating the injection molding machine from the guide.

The rotary multi-injection molding machine may further comprise a shelf spaced apart from the rotary; and a height adjusting mechanism disposed on the shelf and supporting the injection molding machine and the advance and retreat mechanism.

The guide may include an injection molding machine facing surface facing the injection molding machine, and a movable mold facing surface facing the movable mold.

An inlet of the guide passage may be formed on the injection molding machine facing surface.

An outlet of the guide passage may be formed on the movable mold facing surface.

An opening direction of the inlet and an opening direction of the outlet may be different.

The guide may include a plurality of peripheral surfaces, a lower surface, and an upper surface, the injection molding machine facing surface may be one of the plurality of peripheral surfaces, and the movable mold facing surface may be the lower surface.

The guide may have a guide heater installed to heat the guide passage.

The lifting and lowering mechanism may include a lifting and lowering guide; an upper body installed on the lifting and lowering guide; a pressure cylinder installed on the upper body; a guide holder lifted and lowered by the pressure cylinder, and the guide may be disposed on the guide holder.

The injection molding machine may include an injection molding machine body having an internal passage formed; a nozzle installed in the injection molding machine body; a main heater installed in the injection molding machine body; a screw rotatably accommodated in the internal passage; a shaft for rotating the screw; and a shaft supporter for supporting the shaft.

The extraction mechanism may include a frame; an extraction cylinder supported on the frame; a lifting and lowering body lifted and lowered by the extraction cylinder;

and a magnet disposed on the lifting and lowering body and magnetically attached to and detached from the movable mold.

The frame may be disposed on the rotary station.

The rotary multi-injection molding machine may further include an outer slip ring rotating together with the rotary; and an inner slip ring disposed inside the outer slip ring, in which a space may be formed between the outer slip ring and the inner slip ring.

Advantageous Effect

According to the present embodiment, a mold that is fastened in the vertical direction is placed on a rotary, and a guide presses the movable mold in the vertical direction from the upper side of the mold, so that the load of the mold and the pressing force of the guide act on the ground, and a decrease in precision that may occur when the mold is deformed can be minimized.

In addition, since the mold is fastened in the vertical direction and pressurized in the vertical direction, the structure is simple and space utilization is high.

In addition, the injection passage is formed in the movable mold, so that interference between the injection molding machine and the rotary can be minimized.

DESCRIPTION OF DRAWINGS

FIG. 1 is a plan view illustrating a rotary multi-injection molding machine according to the present embodiment;

FIG. 2 is a side view illustrating a rotary multi-injection molding machine according to the present embodiment;

FIG. 3 is an operating state view illustrating a rotary multi-injection molding machine according to the present embodiment; and FIG. 4 is a control block view illustrating a rotary multi-injection molding machine according to the present embodiment.

BEST MODEL

Hereinafter, specific embodiments of the present disclosure will be described in detail with reference to the drawings.

FIG. 1 is a plan view illustrating a rotary multi-injection molding machine according to the present embodiment, and FIG. 2 is a side view illustrating a rotary multi-injection molding machine according to the present embodiment;

FIG. 3 is an operating state view illustrating a rotary multi-injection molding machine according to the present embodiment. FIG. 3(*a*) is a view when the lifting and lowering mechanism does not press the guide with the movable roller and the nozzle of the injection molding machine is not connected to the guide.

FIG. 3(*b*) is a view illustrating a case where the lifting and lowering mechanism presses the guide with a movable roller and the nozzle of the injection molding machine is not connected to the guide.

FIG. 3(*c*) is a view illustrating a case where the lifting and lowering mechanism presses the guide with a movable roller and the nozzle of the injection molding machine is connected to the guide.

A rotary multi-injection molding machine according to the present embodiment may include a rotary station 1; a rotary 2; a plurality of molds 3; an injection molding machine 4; a guide 5; a lifting and lowering mechanism 6, and an extraction mechanism 7.

The rotary station 1 may include a station body 11 forming an outer appearance thereof.

The station body 11 may be a fixed table that rotatably supports the rotary 2. A space S1 in which a rotational driving source 12 is accommodated may be formed inside the station body 11. The station body 11 may include a door 15 that can be opened and closed.

The rotary station 1 may include a rotary driving source 12 that rotates the rotary 2.

The rotation driving source 12 can be placed inside the station body 11.

The rotary driving source 12 may include a motor 13 that generates rotary driving force and a reducer 14 that transmits the driving force generated from the motor 13 to the rotary 2.

The motor 13 may include a rotating shaft, and an example of the motor 13 may be a servo motor.

The reducer 14 may include a driving gear connected to the rotation shaft of the motor 12 and a driven gear that rotates the rotary 2. The reducer 14 may further include an intermediate gear that transmits power between the driving gear and the driven gear.

The rotary driving source 12 can repeat the rotation mode and the stationary mode.

The rotation mode may be a mode in which the rotation driving source 12 rotates the rotary 2 by 120°.

The stationary mode may be a mode in which the rotary driving source 12 does not rotate the rotary 2 and the rotary 2 is stationary.

The rotary 2 can be placed on the upper side of the rotary station 1. The rotary 2 can be placed horizontally on the upper side of the rotary station 1. The rotary 2 can be a circular plate or a ring-shaped plate. The rotary 2 can be rotated around a central axis of rotation. The central axis of rotation of the rotary 2 can be a vertical central axis which is the upper and lower direction Z.

The rotary 2 may be a rotary table which is rotated by a rotary driving source 12.

The rotary 2 can be a rotary table on which a plurality of molds 3 are seated, and the positions of each of the plurality of molds 3 can be changed.

The lower surface of the rotary 2 can face the rotary station 1 in the upper and lower direction Z.

The upper surface of the rotary 2 may be a mold seating surface on which plurality of molds 3 are seated.

The upper surface of the rotary 2 may include an injection region A1; a cooling region A2; and an extraction region A3.

The injection region A1 may be a region where one of the plurality of molds 3 is positioned below the guide 5.

The mold 3 located on the lower side of the guide 5 can be pressurized by the guide 5 and can receive material from the guide 5.

Any one of the plurality of molds 3 can be pressed downward by a guide 5 in the injection region A1 and can receive material from the guide 5.

The cooling region A2 may be a region where another one of the plurality of molds 3 is cooled. The mold 3 located in the cooling region A2 may be cooled by air cooling or water cooling.

The extraction region A3 may be a region where the other one of the plurality of molds 3 is located below the extraction mechanism 7. The mold 3 located below the extraction mechanism 7 can be opened by the extraction mechanism 7 in the extraction region A3. The opened mold 3 can be closed by the extraction mechanism 7 in the extraction region A3.

A plurality of molds 3 can be disposed spaced apart from each other on the rotary 2. Each of the plurality of molds 3 can be disposed on an upper surface of the rotary 2 other than the rotational center axis of the rotary 2 and not on the rotational center axis of the rotary 2.

A plurality of molds 3 can be disposed equiangularly and spaced apart from each other on the rotary 2. The plurality of molds 3 can be spaced apart in the horizontal direction XY. The number of the plurality of molds 3 can be three or four.

When there are three molds 3, the plurality of molds 3 can be disposed at intervals of 120° on the upper surface of the rotary 2. When there are four molds 4, the plurality of molds 3 can be disposed at intervals of 90° on the upper surface of the rotary 2.

Hereinafter, it is described that there are three molds 3 placed in the rotary 2, but of course, the number of molds 3 is not limited.

Each of the plurality of molds 3 may include a fixed mold 31 and a movable mold 32.

A fixed mold 31 and a movable mold 32 can form one set, and a rotary multi-injection molding machine can include a plurality of sets of molds 3.

When there are three sets of molds 3, one set of molds 3 can be positioned in the injection region A1, another set of molds 3 can be positioned in the cooling region A2, and the other set of molds 3 can be positioned in the extraction region A3.

A cavity 33 may be formed in at least one of the fixed mold 31 and the movable mold 32. When the cavity 33 is formed in the fixed mold 31, the cavity 33 may be a fixed cavity formed on the upper surface of the fixed mold. When the cavity 33 is formed in the movable mold 32, the cavity 33 may be a movable cavity formed on the lower surface of the movable mold 32.

The fixed mold 31 can be seated on the upper surface of the rotary 2. The fixed mold 31 can be fixed to the upper surface of the rotary 2.

The movable mold 32 can be seated on the upper surface of the fixed mold 31. The movable mold 32 can be seated on the upper surface of the fixed mold 31 and closed with the fixed mold 31, and can be raised from the fixed mold 31 and opened with the fixed mold 31.

When the movable mold 32 is seated on the fixed mold 31, the movable mold 32 can press the fixed mold 31 from the upper side of the fixed mold 31, and the load of the movable mold 32 can be applied to the fixed mold 31.

An injection passage 34 through which material passes may be formed in at least one of the fixed mold 31 and the movable mold 32. The injection passage 34 may be a material input passage for injecting material into the cavity 33.

The injection passage 34 may be formed in the fixed mold 31 and not formed in the movable mold 32. The injection passage 34 may be formed in the movable mold 32 and not formed in the fixed mold 31. The injection passage 34 may also be formed in each of the fixed mold 31 and the movable mold 32.

When the injection passage 34 is formed in the movable mold 32, the height of the injection molding machine 4 can be high, interference between the injection molding machine 4 and the rotary 2 can be minimized, and it is preferable that the injection passage 34 is formed in the movable mold 32.

Hereinafter, the injection passage 34 is described as being formed in a movable mold 32, but the injection passage 34 is not limited to being formed in a movable mold 32, and it is of course also possible to form the injection passage in a fixed mold 31.

The inlet of the injection passage 34 may be formed on the upper surface of the movable mold 32, and the outlet of the injection passage 34 may be communicated with the cavity 33. The injection passage 34 may include a vertical passage formed long in the upper and lower direction Z in the movable mold 32.

The injection molding machine 4 can mold and supply the material. The injection molding machine 4 can heat the raw material, that is, resin, to change the resin into molten resin, and supply the converted molten resin to the guide 5. In other words, the injection molding machine 4 can supply the material (that is, molten resin) to the guide 5.

An injection molding machine 4 may include an injection molding machine body 41 having an internal passage formed therein; a nozzle 42 installed in the injection molding machine body 41; a main heater 43 installed in the injection molding machine 41; a screw 44 rotatably accommodated in the internal passage; a shaft 45 rotating the screw 44; and a shaft supporter 46 supporting the shaft 44.

The injection molding machine body 41 can be formed with a hopper through which material is fed into an internal passage.

The nozzle 42 can be formed at one end of the injection molding machine body 41.

The main heater 43 can be installed between the inner and outer walls of the injection molding machine body 41.

The screw 44 can be disposed long in a front and rear direction X in the internal passage, and when rotated, can transport the material to the nozzle 42.

A shaft 45 can be connected to one end of a screw 44. The shaft 45 can be disposed long in the front and rear direction X.

The shaft supporter 46 can be connected to the other end of the injection molding machine body 41.

The injection molding machine 4 may further include an injection motor 47 that rotates the shaft 45.

A rotary multi-injection molding machine may include a motor housing 48 surrounding an injection motor 47.

The injection motor 47 can be placed in the shaft supporter 46 or the motor housing 48.

The rotary multi-injection molding machine may further include an advance and retreat mechanism 8.

The advance and retreat mechanism 8 can advance the injection molding machine 4 to the guide 5 or retreat the injection molding machine 4 from the guide 5.

The advance and retreat mechanism 8 can advance and retreat the injection molding machine 4 in the front and rear direction X.

The advance and retreat mechanism 8 may include an advance and retreat shaft 81 and an advance and retreat driving source 82 that advances and retreats the advance and retreat shaft 81.

The advance and retreat shaft 81 can be connected to the injection molding machine 4 and can advance and retreat the injection molding machine 4 in the front and rear direction X.

The advance and retreat shaft 81 can be connected to at least one of the injection molding machine body 41 and the shaft supporter 46.

The advance and retreat shaft 81 may be a hollow shaft, and the shaft 45 may be rotatably accommodated inside the advance and retreat shaft 81.

The advance and retreat driving source 82 may include a advance and retreat motor capable of advancing and retreating the advance and retreat shaft 81. The advance and retreat driving source 82 may further include at least one power transmission member that transmits the driving force of the advance and retreat motor to the advance and retreat shaft.

The advance and retreat driving source 82 can be placed in the motor housing 48.

The injection molding machine 4 can be advanced to the first position P1 by the advance and retreat mechanism 8 as illustrated in FIG. 3(*c*) and connected to the guide 5.

The injection molding machine 4 can be retreated to the second position P2 as illustrated in FIG. 3(*a*) or (*b*), and can be spaced apart from the guide 5 in the front and rear direction X.

The injection molding machine 4 can be advanced to the first position P1 and connected to the guide 5 after the guide 5 is lowered by the lifting and lowering mechanism 6.

The injection molding machine 4 can be retreated to the second position P2 before the guide 5 is lifted by the lifting and lowering mechanism 6 and separated from the guide 5.

When the injection molding machine 4 is positioned at the second position P2, the lifting and lowering mechanism 6 can lift and lower the guide 5 to the first height h1 or the second height h2.

When the lifting and lowering mechanism 6 lowers the guide 5 to the first height h1, the advance and retreat mechanism 8 can advance the injection molding machine 4 to the first position P1.

While the advance and retreat mechanism 8 has retreated the injection molding machine 4 to the second position P2, the lifting and lowering mechanism 6 can lift the guide 5 to the second height h2.

The guide 5 can pressurize the movable core 32 to the fixed core 31.

The guide 5 can guide the material supplied from the injection molding machine 4 to the mold 3. A guide passage 51 can be formed in the guide 5, and the guide passage 51 can guide the material supplied from the injection molding machine 4 to the guide 5 to the mold 3. The guide passage 51 can guide the material supplied from the injection molding machine 4 to the guide 5 to the movable core 32. The guide passage 51 can guide the material supplied from the injection molding machine 4 to the injection passage 34 of the mold 3 located in the injection region A1.

The guide 5 may be separated from or connected to each of the movable core 32 and the injection molding machine 4. The guide 5 may be a nozzle-to-mold connector or a nozzle-to-mold manifold disposed between the nozzle 42 and the movable core 32.

When the guide 5 presses the movable mold 32 of the mold 3 and the nozzle 42 of the injection molding machine 4 is connected to the guide passage 51 of the guide 5, the injection molding machine 4 can supply material to the guide passage 51 of the guide 5, the guide 5 can guide the material in the guide passage 51 to the injection passage 34, and the material guided to the injection passage 34 can be injected into the cavity 33.

When the guide 5 is lowered by the lifting and lowering mechanism 6, the guide can pressurize the movable mold 32 from the upper side of the movable mold 32.

When the guide 5 presses the movable mold 32 from the upper side of the movable mold 32, the pressing force acts in a downward direction, and the mold fastening force that fastens the movable mold 32 with the fixed mold 31 can be maximized.

The weight of the mold 3 and the pressure of the guide 5 can be applied to the ground on which the rotary multi-injection molding machine is installed, and the deterioration of the precision of the product due to loss or deformation of the mold 3 can be minimized.

In other words, the guide 5 may be a pressing member that improves the mold fastening force and a material guide that transfers the material to the movable mold 32.

The guide 5 can be placed in the guide holder 64 of the lifting and lowering mechanism 6. The upper surface of the guide 5 can be placed in the guide holder 64.

The guide 5 may include an injection molding machine facing surface 52 facing the injection molding machine 4 and a movable mold facing surface 53 facing the movable mold 32, as illustrated in FIG. 3(*a*).

The injection molding machine facing surface 52 can face the injection molding machine 4 in the front and rear direction X.

The movable mold facing surface 53 can face the movable mold 32 in the upper and lower direction Z.

The inlet 51*a* of the guide passage 51 can be formed on the injection molding machine facing surface 52.

The outlet 51*b* of the guide passage 51 can be formed on the movable mold facing surface 53.

The guide passage 51 may have a shape that is bent at least once.

The opening direction of the inlet 51*a* and the opening direction of the outlet 51*b* may be different. The opening direction of the inlet 51*a* and the opening direction of the outlet 51*b* may be orthogonal.

The opening direction of the inlet 51*a* can be horizontal and can be the same as the advancing/retreating direction X of the injection molding machine 4. The opening direction of the inlet 51*a* can be the front and rear direction X.

The opening direction of the outlet 51*b* can be vertical or in the upper and lower direction Z.

The guide 5 may include a plurality of peripheral surfaces and a lower surface and an upper surface.

One of the plurality of peripheral surfaces of the guide 5 can be in contact with or separated from the nozzle 42.

The lower surface of the guide 5 can be in contact with or separated from the movable mold 32.

The upper surface of the guide 5 may be a fixed surface fixed to the guide holder 64.

The injection molding machine facing surface 52 may be one of the multiple peripheral surfaces of the guide 5.

The movable mold facing surface 53 may be the lower surface of the guide 5.

A guide heater 54 for heating the guide passage 51 may be installed in the guide 5. The guide heater 54 can heat the material passing through the guide passage 51 so that the molten resin, which is the material, is not cooled while passing through the guide 5.

The lifting and lowering mechanism 6 can lift and lower the guide 5.

The lifting and lowering mechanism 6 may include a lifting and lowering guide 61; an upper body 62 installed on the lifting and lowering guide 61; a pressure cylinder 63 installed on the upper body 62; and a guide holder 64 lifted and lowered by the pressure cylinder 63.

The lifting and lowering guide 61 can be placed on the rotary station 1. The lifting and lowering guide 61 can be supported on the rotary station 1. A pair of lifting and lowering guides 61 can be placed in the upper and lower direction on the rotary station 1. A pair of lifting and lowering guides 61 can be spaced apart in the horizontal direction.

The upper body 62 can be placed horizontally on the upper part of the lifting and lowering guide 61.

The pressure cylinder 63 can be supported on the upper body 62 and spaced apart from the upper surface of the rotary station 1 in the upper and lower direction Z.

The guide holder 64 can be lifted and lowered in the upper and lower direction Z by the pressure cylinder 63.

A pair of guide holes guided by a pair of lifting and lowering guides 61 may be formed in the guide holder 64. Each of the pair of guide holes may be formed to be open in the upper and lower direction Z of the guide holder 64.

The guide holder 64 may be a guide fastening plate to which the guide 5 is fastened. The lower surface of the guide holder 64 may be a guide fastening surface to which the guide 5 is fastened. The guide 5 may be hung on the guide holder 64.

When the guide holder 64 is lowered, the guide 5 can press the pressure roller 32 downward, and when the guide holder 64 is lifted, the guide 5 can be spaced apart from the pressure roller 32 in the upper and lower direction Z.

The lifting and lowering mechanism 6 can maintain the guide 5 at the second height h2 while the rotary 2 rotates, and when one of the plurality of molds 3 completes moving to the injection region A1, the guide 5 can be lowered to the first height H1.

The extraction mechanism 7 can lift and lower the movable mold 32 of the mold 3 located in the extraction region A3 among plurality of molds 3.

The extraction mechanism 7 can lift the movable mold 32 among the molds 3 located in the extraction region A3 to open the mold 3 located in the extraction region A3.

After the extraction mechanism 7 opens the mold 3, a machine such as a robot can extract a product (that is, a molded product or a finished product) from the opened mold 3.

The extraction mechanism 7 may include a frame 71; an extraction cylinder 72 supported on the frame 71; a lifting and lowering body 73 lifted and lowered by the extraction cylinder 72; and a magnet 74 disposed on the lifting and lowering body 73 and is magnetically attached to and detached from the movable mold.

The frame 71 can be placed in the rotary station 1. The frame 71 can be positioned around the rotary station 1.

The frame 71 may include a vertical frame 71A and a horizontal frame 71B.

The vertical frame 71A can be long in the upper and lower direction Z.

The horizontal frame 71B can extend horizontally from the upper portion of the vertical frame 71A.

A lifting and lowering guide 71C can be placed on the frame 71.

The lifting and lowering guide 71C can extend downward from the horizontal frame 71B. A pair of lifting and lowering guides 71C can be disposed on the horizontal frame 71B. The pair of lifting and lowering guides 71C can be spaced apart in the horizontal direction.

The extraction cylinder 72 can lower the lifting and lowering body 73 when a plurality of other molds 3 have been moved to the extraction region A3, and the magnet 74 disposed in the extraction body 73 can be magnetically fixed to the movable mold 32 of the mold 3 located in the extraction region A3.

The extraction cylinder 72 can lift the lifting and lowering body 73 when the magnet 74 is magnetically fixed to the movable mold 32 of the mold 3 located in the extraction region A3.

The lifting and lowering body 73 can be lifted and lowered by the extraction cylinder 72, and the magnet 74 can be pressed into the movable mold 32 among the molds 3.

The lower surface of the lifting and lowering body 73 may be a magnet attachment surface to which a magnet 74 is attached.

The magnet 74 can be placed on the lower surface of the lifting and lowering body 73, and when it is lifted by the lifting and lowering body 73 while being magnetically fixed to the movable mold 32 among the molds 3, the movable mold 32 can be lifted. At this time, the movable mold 32 can be opened with the fixed mold 31.

The magnet 74 can be lowered to press the movable mold 32 downward and close the movable mold 32 with the fixed mold 31.

When the rotary 2 rotates while the movable mold 32 is closed with the fixed mold 31, the movable mold 32 moves horizontally together with the fixed mold 31, and the movable mold 32 can be separated from the magnet 74.

The rotary multi-injection molding machine may further include a shelf 9 and a height adjustment mechanism 10.

The shelf 9 can be spaced apart from the rotary 2. The shelf 9 can be spaced apart from the rotary station 1. The shelf 9 can be spaced apart from the rotary station 1 in the front and rear direction X.

The shelf 9 can be connected to the rotary station 1 and the bridge 91.

A control device 92, such as a control board, can be placed on the shelf 9.

The height adjustment mechanism 10 can be placed on the shelf 9. The height adjustment mechanism 10 can be placed on the upper surface of the shelf 9. The height adjustment mechanism 10 can support the injection molding machine 4 and the advance and retreat mechanism 8.

The height adjustment mechanism 10 may include a fixed plate 101, a lifting and lowering plate 102 positioned above the fixed plate 101, and a plurality of height adjustment members 103, 104 that support the lifting and lowering plate 102 and adjust the height of the lifting and lowering plate 102.

The plurality of height adjustment members 103, 104 may include a lifting and lowering bolt 103 rotatably disposed on a fixed plate 101 and a nut 104 that is lifted and lowered along the outer surface of the lifting and lowering bar 103 and fixed to the lifting and lowering plate 102.

When the worker rotates the lifting and lowering bolt 103, the lifting and lowering plate 102 can be lifted and lowered, and the height of the injection molding machine 4 and the advance and retreat mechanism 8 can be adjusted.

The multi-injection molding machine may further include a slip ring 110.

The slip ring 110 may further include an outer slip ring 112 that rotates together with the rotary 2; and an inner slip ring 114 disposed inside the outer slip ring 112.

The outer slip ring 112 can be fixed to the rotary 2.

The outer slip ring 112 may be connected to a cooling water inlet pipe (not illustrated) that guides cooling water to the mold 3 and a cooling water outlet pipe (not illustrated) that discharges cooling water that cools the mold 3.

The cooling water inlet pipe and the cooling water outlet pipe can correspond 1:1 with the mold 3.

The inner slip ring 114 can be positioned fixedly in the rotary station 1.

The size of the inner slip ring 114 may be smaller than the size of the outer slip ring 112.

A space 116 can be formed between the outer slip ring 112 and the inner slip ring 114.

The space 116 may be used as a cooling flow path through which cooling water passes to cool the mold 3 or may be a passage through which electrical wires (not illustrated) pass.

In the space 116, a cooling water inlet flow path and a cooling water outlet flow path can be partitioned by a barrier.

FIG. 4 is a control block view illustrating a rotary multi-injection molding machine according to the present embodiment.

The rotary multi-injection molding machine may further include an input interface 93 and a processor 94.

The input interface 93 may include buttons, switches, or a touch screen through which a worker can input various commands for the rotary multi-injection molding machine.

The processor 94 can control the overall operation of the rotary multi-injection molding machine. The processor 94 can configure a control device 92 disposed on the shelf 9.

The processor 94 can control the rotary station 1, the injection molding machine 4, the guide 5, the lifting and lowering mechanism 6, the extraction mechanism 7, and the advance and retreat mechanism 8.

The processor 94 can control the rotation driving source 12 of the rotary station 1.

The processor 94 can control the main heater 43 of the injection molding machine 4. The processor 94 can control the injection motor 47.

The processor 94 can control the guide heater 54 of the guide 5.

The processor 94 can control the lifting and lowering cylinder 63 of the lifting and lowering mechanism 6.

The processor 94 can control the extraction cylinder 72 of the extraction mechanism 7.

The processor 94 can control the advance and retreat driving source 82 of the advance and retreat mechanism 8.

Below, the operation of the rotary multi-injection molding machine is described.

The processor 94 can sequentially perform an injection process, a first rotation process, a cooling process, a second rotation process, an extraction process, and a third rotation process, and the injection process, the first rotation process, the cooling process, the second rotation process, the extraction process, and the third rotation process can constitute one cycle for molding a product (molded product or finished product).

The injection process, cooling process, and extraction process can each be performed during the first hour.

Each of the first rotation process, the second rotation process, and the third rotation process can be performed for a second time.

The first hour may be longer than the second hour.

During the injection process, the processor 94 advances the injection molding machine 4 forward, and when the injection molding machine 4 is advanced, the nozzle 42 of the injection molding machine 4 can be connected to the guide passage 51 of the guide 5. After the nozzle 42 is connected to the guide passage 51 of the guide 5, the processor 94 can control the injection molding machine 4 to fill the material into the guide 5. The material molded in the injection molding machine 4 can pass through the guide passage 51 of the guide 5, and then pass through the injection passage 34 of the movable mold 32 located in the injection region A1, and be filled into the cavity 33.

The processor 94 can pressurize the mold 3 for a set time (for example, 4 seconds), and after the set time has elapsed, the processor 94 can retreat the injection molding machine 4. When the injection molding machine 4 retreats, the nozzle 42 of the injection molding machine 4 can be separated from the guide passage 51 of the guide 5, and the nozzle 42 can be spaced apart from the guide 5.

The processor 94 can perform a first rotation process after the injection process. The processor 94 can drive the rotation driving source 12 for a rotation setting time, and the rotation driving source 12 can rotate the rotary 2 at a setting angle (for example, 120°), and the mold 3 in the injection region A1 can be moved to the cooling region A2.

The mold 3 in the cooling region A2 is maintained for a cooling setting time, and the material within the mold 3 can be solidified to become a product (molded product or finished product). When the cooling setting time has elapsed, the cooling process can be completed.

The processor 94 can perform a second rotation process after the cooling setting time. The processor 94 can drive the rotation driving source 12 for the rotation setting time, and the rotation driving source 12 can rotate the rotary 2 at a setting angle (for example, 120°), and the mold 3 in the cooling region A2 can be moved to the extraction region A3.

When the mold 3 in the cooling region A2 is moved to the extraction region A3, the processor 94 can initiate the extraction process.

The processor 94 can lower the magnet 74 during the extraction process to fasten the magnet 74 to the movable mold 32, and when the fastening with the movable mold 32 is completed, the magnet 74 can be lifted. When the magnet 74 is lifted, the movable mold 32 located in the extraction region A3 can be lifted, and the mold 3 located in the extraction region A3 can be opened.

An extraction machine such as a robot can extract a product (molded product or finished product) that has been molded in a mold 3 to the outside of the mold 3.

After the product extraction is completed, the processor 94 can lower the magnet 74 to seat the lifted movable mold 32 back on the fixed mold 31, and the mold 3 can be closed. After the mold 3 is closed, the magnet 74 can be separated from the mold 3.

After the mold 3 is closed, the processor 94 can perform the third rotation process. The processor 94 can drive the rotation driving source 12 for a rotation setting time, and the rotation driving source 12 can rotate the rotary 2 at a setting angle (for example, 120°), and the mold 3 in the extraction region A3 can be moved back to the injection region A1.

The processor 94 can repeat one cycle consisting of an injection process, a first rotation process, a cooling process, a second rotation process, an extraction process, and a third rotation process.

The above description is merely an example of the technical idea of the present disclosure, and those skilled in the art will appreciate that various modifications and variations may be made without departing from the essential characteristics of the present disclosure.

Accordingly, the embodiments disclosed in the present disclosure are not intended to limit the technical idea of the present disclosure but to explain it, and the scope of the technical idea of the present disclosure is not limited by these embodiments.

The scope of protection of the present disclosure should be interpreted by the claims below, and all technical ideas within a scope equivalent thereto should be interpreted as being included in the scope of the rights of the present disclosure.

The invention claimed is:

1. A rotary multi-injection molding machine comprising:

a rotary station in which a rotational driving source is disposed;

a rotary disposed above the rotary station and rotates by the rotational driving source;

a plurality of molds disposed spaced apart from each other on the rotary, in which a cavity is formed at least one of a fixed mold and a movable mold, and in which an injection passage through which material passes is formed in the movable mold;

an injection molding machine for molding and supplying a material;

a guide having a guide passage formed therein for guiding the material supplied from the injection molding machine to the injection passage;

a lifting and lowering mechanism for lifting and lowering the guide;

an extraction mechanism for lifting and lowering the movable mold of a mold located in an extraction region among the plurality of molds, and an advance and retreat mechanism for advancing the injection molding machine to the guide or for retreating the injection molding machine from the guide, wherein the guide, when the guide is lowered by the lifting and lowering mechanism, presses the movable mold from above the movable mold, wherein an upper surface of the rotary includes:

an injection region in which one of the plurality of molds is located below the guide;

a cooling region in which another of the plurality of molds is cooled; and the extraction region in which the other of the plurality of molds is located below the extraction mechanism, wherein the lifting and lowering mechanism maintains the guide at a second height while the rotary is rotating, wherein the lifting and lowering mechanism lowers the guide to a first height when any one of the plurality of molds is moved to the injection region, wherein the advance and retreat mechanism advances the injection molding machine to a first position to connect the injection molding machine to the guide after the guide is lowered by the lifting and lowering mechanism, and wherein the advance and retreat mechanism retreats the injection molding machine to a second position to separate the injection molding machine from the guide before the guide is raised by the lifting and lowering mechanism.

2. The rotary multi-injection molding machine of claim 1, wherein a number of the plurality of molds is three, and wherein the rotary driving source repeats a rotation mode that rotates the rotary by 120° and a stop mode that stops the rotary.

3. The rotary multi-injection molding machine of claim 1, wherein the fixed mold is fixed to an upper surface of the rotary, and wherein the movable mold is seated on an upper surface of the fixed mold.

4. The rotary multi-injection molding machine of claim 1, further comprising a shelf spaced apart from the rotary; and a height adjusting mechanism disposed on the shelf and supporting the injection molding machine and the advance and retreat mechanism.

5. The rotary multi-injection molding machine of claim 1, wherein the guide includes:

an injection molding machine facing surface facing the injection molding machine, and a movable mold facing surface facing the movable mold, and wherein an inlet of the guide passage is formed on the injection molding machine facing surface, and wherein an outlet of the guide passage is formed on the movable mold facing surface.

6. The rotary multi-injection molding machine of claim 5, wherein an opening direction of the inlet and an opening direction of the outlet are different.

7. The rotary multi-injection molding machine of claim 5, wherein the guide includes a plurality of peripheral surfaces, a lower surface, and an upper surface, wherein the injection molding machine facing surface is one of the plurality of peripheral surfaces, and wherein the movable mold facing surface is the lower surface.

8. The rotary multi-injection molding machine of claim 1, wherein the guide has a guide heater installed to heat the guide passage.

9. The rotary multi-injection molding machine of claim 1, wherein the lifting and lowering mechanism includes:

a lifting and lowering guide;

an upper body installed on the lifting and lowering guide;

a pressure cylinder installed on the upper body; and a guide holder lifted and lowered by the pressure cylinder, wherein the guide is disposed on the guide holder.

10. The rotary multi-injection molding machine of claim 1, wherein the injection molding machine includes:

an injection molding machine body having an internal passage formed;

a nozzle installed on the injection molding machine body;

a main heater installed in the injection molding machine body;

a screw rotatably accommodated in the internal passage;

a shaft for rotating the screw; and a shaft supporter for supporting the shaft.

11. The rotary multi-injection molding machine of claim 1, wherein the extraction mechanism includes:

a frame;

an extraction cylinder supported on the frame;

a lifting and lowering body lifted and lowered by the extraction cylinder; and a magnet disposed on the lifting and lowering body and magnetically attached to and detached from the movable mold.

12. The rotary multi-injection molding machine of claim 11, wherein the frame is disposed on the rotary station.

13. The rotary multi-injection molding machine of claim 1, further comprising:

an outer slip ring rotating together with the rotary; and an inner slip ring disposed inside the outer slip ring, wherein a space is formed between the outer slip ring and the inner slip ring.

* * * * *